United States Patent Office 3,312,658
Patented Apr. 4, 1967

3,312,658
STABILIZED POLYPROPYLENE COMPOSITIONS CONTAINING (A) A NICKEL SALT OF A PHOSPHORIC ACID ESTER, (B) A PHENOLIC ANTI-OXIDANT, AND (C) OPTIONALLY AN EPICHLOROHYDRINAMINE CONDENSATION PRODUCT
Tsutomu Kamijo, Higashiyama-ku, Kyoto, Hiroshi Hatakeyama, Shimokyo-ku, Kyoto, and Osamu Fukumoto, Ohtsu-shi, Japan, assignors to Toyo Rayon Kabushiki Kaisha, Chuo-ku, Tokyo, Japan, a corporation of Japan
No Drawing. Filed Oct. 21, 1964, Ser. No. 405,589
Claims priority, application Japan, Oct. 22, 1963, 38/55,960; Mar. 30, 1964, 39/17,374
8 Claims. (Cl. 260—45.75)

This invention relates to polypropylene compositions having excellent stability to light and heat. More particularly, it relates to compositions having remarkably elevated stability to light and heat which are obtained by adding to polypropylene stabilizers which have synergistic effects on to each other.

Heretofore, in order to provide polypropylene with a stability to light and heat, it has been suggested to admix various stabilizers with polypropylene. However, among the combinations of many stabilizers suggested, only the combination of a so-called anti-oxidant and a agent having a synergistic action thereon has been employed in practice. A preferable combination is an alkyl-substituted phenolic anti-oxidant and a dialkyl ester of thiodipropionic acid. However, this combination has a disadvantage as mentioned below. Recently, in order to improve the dyeing property of polypropylene which is substantially unable to be dyed, there has been devised a method in which polypropylene is previously admixed with an organometallic compound comprising a metal of Group II, or VIII in period 4 of the Periodic Table, such as nickel stearate, and the obtained article such as a fiber is dyed with the use of a compound which forms a chelate with the said metal and gives a fast dyeing. However, when a dialkyl ester of thiodipropionic acid is used for the purpose of stabilization of polypropylene containing such a metal salt, a black-grayish coloring of the polypropylene is produced by a metal sulfide which is formed by high temperature heating at the time of melt-shaping, whereby the commercial value of the goods is remarkably lowered.

In order to find a combination of alkyl-substituted phenolic anti-oxidant and synergistic agent which exhibits excellent stabilities and avoids the above disadvantage, we made extensive studies of various compounds and have found that a nickel salt of a monoester or diester of phosphoric acid represented by the general formula shown below or a mixture thereof is an extremely advantageous compound for the synergistic agent:

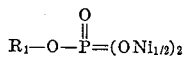

or

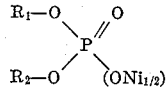

where $R_1$ and $R_2$ represent respectively radicals selected from the group consisting of alkyl, aryl, alkaryl and cycloalkyl radicals.

The above-mentioned nickel salt of monoester or diester of phosphoric acid by itself provides almost no stabilizing action against light and heat for polypropylene. However, if it is used conjointly with an alkyl-substituted phenolic anti-oxidant, it shows a surprising effect. The degree of synergy with respect to stabilization of polypropylene is equal to, or more than, that of the dialkyl ester of thiodipropionic acid which is currently in use. Moreover, these esters of phosphoric acid have the remarkable advantage that they confer almost no discoloration to polypropylene containing said organometallic compound which is added to improve the dyeing property. Thereby, these esters can favorably be employed in the dyeing of polypropylene.

Also, in order to overcome the disadvantage that the conventional additives for the stabilization of polypropylene are easily dissolved and leave a deposit when formed materials of polypropylene are treated with hot water or various chemicals, we have made extensive studies and have found that, though the simple use of an additive consisting of two materials of said alkyl-substituted phenolic anti-oxidant and said nickel salt of phosphoric acid is sufficiently effective to overcome the above-mentioned disadvantage, the conjoint use of a condensation product of epichlorohydrin and amines together with said two materials gives rise to increased effect.

A polypropylene composition comprising a condensation product of epichlorohydrin and amines is already known. However, such a composition causes degeneration owing to a heating treatment during the melt-forming and by itself never produces a stabilizing effect on polypropylene. Nevertheless, it is of great interest that a synergistic stabilization is exhibited by the combination of an alkyl-substituted phenolic anti-oxidant and nickel salt of an ester of phosphoric acid and that the deposit of the anti-oxidant is prevented even if the formed polyolefine is treated with hot water or various chemical agents.

The alkyl-substituted phenolic anti-oxidant employed in this invention is a compound containing an alkyl-substituted phenol radical which is well known and is widely used as an anti-oxidant for polyolefines. Typical examples are di-tert-butyl-p-cresol, 2,2'-methylene-bis(4-methyl - 6 - tert - butylphenol), 2,6 - bis(2' - hydroxy-3' - tert - butyl - 5' - methylbenzyl) - 4 - methylphenol, 1,1,3 - tris(2 - methyl - 4 - hydroxy - 5-tert-butylphenyl)-butane, 2,2' - methylene - bis(4 - methyl - 6 - cyclohexyl-phenol), di-n-octadecyl ester of (4-hydroxy-3,5-di-tert-butyl)benzylphosphonic acid, 4,4'-butylidene-bis(6-tert-butyl - 3 - methylphenol), 6 - (4 - hydroxy - 3,5 - di - tert-butylphenylcyclohexylamino) - 2,4 - bis(n - octylthio)-1,3,5-triazine, and so on. These phenolic anti-oxidants may be employed in combination of two or more. The amount added is between 0.01–1% by weight to polypropylene.

The nickel salts of mono- or diesters of phosphoric acid employed in this invention include: nickel monooctyl phosphate, nickel dioctyl phosphate, nickel monolauryl phosphate, nickel dilauryl phosphate, nickel monophenyl phosphate, nickel diphenyl phosphate, nickel octylphenyl phosphate, nickel mono-p-tert-butylphenyl phosphate, nickel di-p-tert-butylphenyl phosphate, nickel monocyclohexyl phosphate, nickel dicyclohexyl phosphate, nickel monocetyl phosphate, nickel dicethyl phosphate, nickel monostearyl phosphate, nickel distearyl phosphate, nickel mono-2-methylpentyl phosphate, nickel di-2-methylpentyl phosphate, nickel mono-2-ethylhexyl phosphate, nickel di-2-ethylhexyl phosphate, nickel mono-tert-butyl phosphate, nickel di-tert-butyl phosphate, and so on. These nickel salts may be employed in combination of two or more. The amount added is 0.05–3% by weight to polypropylene. If the amount added is less than 0.05%, it brings in no substantial effect in practice; on the other hand, even if an amount of more than 3% is added, there is no prominent effect in return.

As suitable condensation products of epichlorohydrin and amines are epichlorohydrin with one or more polyamines or epichlorohydrin, aliphatic long chain alkylmonoamine and polyamines.

As polyamines there may be employed such aliphatic, aromatic and heterocyclic polyamines as ethylenediamine, diethylenetriamine, triethylenetetramine, 1,2-propylenediamine, hexamethylenediamine, piperazine, 1,8-p-menthanediamine, N,N'-diisopropylhexamethylenediamine, 1,3 - bis(n - dodecylamine) - 2 - propanol, 4,4' - bis(methylamine)diphenylmethane, and so on. Mono- or dihexylamine, mono- or dioctylamine, mono- or dilaurylamine, mono- or distearylamine and other similar primary or secondary amines are suitable as the aliphatic long chain alkylmonoamines. Particularly preferred is a polymer consisting of 0.5–1.5 mols of epichlorohydrin condensed with 1.0 mol of a polyamine. If 0.1–0.5 mol of long chain monoalkylamine is simultaneously condensed therewith, the compatibility of the condensation product to polypropylene can be further increased due to the introduction of a long chain alkyl radical.

These condensation products are added to polypropylene in an amount of 0–15% by weight. It is undesirable to add more than 15% thereof, since the mechanical properties of the formed material of polypropylene are deteriorated because of the addition.

In the preparation of the compositions of this invention, the polypropylene may be substituted by a copolymer consisting of propylene as the main constituent and a monomer having an ethylenically unsaturated bond, such as propylene-ethylene copolymer and propylene-butene-1 copolymer, or a mixture with other additive material having polypropylene as a main constituent, such as polypropylene containing small amounts of a heteropolymer such as polyamide, polyester, and polyvinyl compound, polypropylene containing various coloring agents or any agent giving dyeability, polypropylene containing a stabilizer other than the one employed in this invention or an ultraviolet ray absorbent such as 2-hydroxy-4-n-octoxybenzophenone and 2(2'-hydroxy-5-methylphenyl)benzotriazole. Particularly, it is of great interest to employ polypropylene which has an easy-dyeing property and is obtained by adding an organometallic compound thereto.

When to polypropylene, there is added an additive composed of a combination of said alkyl-substituted phenolic anti-oxidant and said nickel salt of ester of phosphoric acid or to propylene mixed with the organometallic compound there is further added a condensation product of said epichlorohydrin with polyamines, there is obtained according to the invention polypropylene having excellent stability to heat and light without the production of a black-grayish coloring of the polypropylene due to the formation of a sulfide produced by a reaction with the metal which is previously added to polypropylene to improve its dyeability, when it is heated at high temperatures for melt forming and also without depositing the additive from the polypropylene when formed materials of polypropylene are treated with hot water or various chemical agents.

These additives according to this invention may be admixed optionally before or during the processing of the polypropylene. For instance, there are employed such methods in which they are admixed in a molten state during the process of forming polypropylene chips from the powder thereof or during the manufacture of the final product such as staple, film, monofilament and others. Also suitable is the mixing of the additives by means of a solvent.

The examples of this invention are directed to polypropylene multifilaments; however, this invention may be applied to any type of formed polypropylene product.

The amounts of additives described in the examples are given in percent by weight based on the weight of the polypropylene. The Weather-o-meter used in experiments is WE-2 type manufactured by Toa Rika Industry Co., Ltd. (Japan).

*Example 1*

To isotactic polypropylene having an intrinsic viscosity of 1.53 were added 0.2% of 4,4'-butylidene-bis(6-tert-butyl-3-methylphenol) and 0.6% of a mixture consisting of nickel monooctyl phosphate and nickel dioctyl phosphate in the proportion of 1:1, and they were melted and mixed at 200° C. for 30 minutes. This composition was then melted again at 260° C. and spun. A multifilament (5 monofilaments) of 50 deniers obtained by thermal drawing 4.3 times had a strength of 5.8 g./d. and an elongation of 23.5%, and showed a slightly greenish color. When this sample was subjected to ultraviolet rays in the Weather-o-meter for 200 hours, it was found that, 85% of the original strength was maintained. In the case in which a mixture of nickel monooctyl phosphate and nickel dioctyl phosphate in the proportion of 1:1 was not added, only 34% the original strength was maintained. When, instead of the said mixture, an equal amount of dilauryl ester of thiodipropionic acid was employed, 79% of the original strength was maintained.

When 4,4'-butylidene-bis(6 tert-butyl-3-methylphenol) was not added, the strength decreased too much to be determined.

*Example 2*

When 2,2'-methylene-bis(4-methyl-6-tert-butylphenol) was used instead of 4,4'-butylidene-bis(6-tert-butyl-3-methylphenol) in Example 1, a similar result was obtained.

*Example 3*

When a mixture of nickel monolauryl phosphate and nickel dilauryl phosphate in the proportion of 1:1 was used instead of the mixture of nickel monooctyl phosphate and nickel dioctyl phosphate in the proportion of 1:1 in Example 1, the degree of strength maintained after irradiation in the Weather-o-meter for 200 hours was 72%. When only a mixture of nickel monolauryl phosphate and nickel dilauryl phosphate in the proportion of 1:1 was added, the strength decreased too much to be determined.

*Example 4*

To isotactic polypropylene having an intrinsic viscosity of 1.53 were added 0.25% of 1,1,3-tris(2-methyl-4-hydroxy-5-tert-butylphenol)butane, 0.6% of a mixture of nickel monooctyl phosphate and nickel dioctyl phosphate in the proportion of 1:1 and 2% of zinc laurate as an agent for dyestuff affinity, and they were melted and mixed at 200° C. for 30 minutes. This composition was then melted again at 260° C. and spun. A multifilament of 75 deniers (36 monofilaments) obtained by thermal drawing 4.5 times had a strength of 6.7 g./d. and an elongation of 21.3%. When this sample was subjected to ultraviolet rays in the Weather-o-meter for 200 hours, 89% of the original strength was maintained. However, when a mixture of nickel monooctyl phosphate and nickel dioctyl phosphate in the proportion of 1:1 was not added, only 45% of the original strength was maintained, and when 1,1,3-tris(2-methyl-4-hydroxy-5-tert-butylphenol)butane was not added, the strength decreased too much to be determined.

*Example 5*

To isotactic polypropylene having an intrinsic viscosity of 1.45 were added 0.20% of 2,2'-methylene-bis(4-methyl-6-cyclohexylphenol), 0.6% of a mixture of nickel monooctyl phosphate and nickel dioctyl phosphate in the proportion of 1:1 and 2% of nickel acetylacetonate as an agent for dyestuff affinity. A multifilament obtained in the same manner as in Example 4 did not show any coloring and the degree of strength maintained after irradiation in the Weather-o-meter for 200 hours was 83%. On the other hand, when no nickel phosphate was added, the degree was 47%.

*Example 6*

The stabilized polypropylene multifilament of this invention prepared in Example 4 was placed in a hot air circulating oven maintained at 100° C. The time required until the sample became brittle was 240 hours. On the other hand, when a mixture of nickel monooctyl phosphate and nickel dioctyl phosphate in the proportion of 1:1 was not added, it was 96 hours. When 0.25% of 1,1,3-tris(2-methyl-4-hydroxy-5-tert-butylphenyl)butane was not contained, it was 48 hours.

*Example 7*

To isotactic polypropylene having an intrinsic viscosity of 1.53 were added 0.25% of di-n-octadecyl ester of (4-hydroxy-3,5-di-tert-butyl)benzylphosphonic acid, 0.6% of nickel octylphenyl phosphate and 1.5% of nickel stearate as an agent for dyestuff affinity, and they were melted and mixed at 200° C. for 30 minutes. This composition was then melted again at 260° C. and spun. A multifilament (36 monofilaments) of 75 deniers obtained by thermal drawing 4.5 times had a strength of 6.9 g./d. and an elongation of 22.1%. When this sample was subjected to ultraviolet rays in the Weather-o-meter for 200 hours, it was found that its original strength was maintained by 83%.

When, instead of this nickel octylphenyl phosphate, 0.6% of dilauryl ester of thiodipropionic acid was added, the original strength was maintained by 75%. That was a fairly good result, but the multifilament obtained was not desirable as it had a black-grayish color.

*Example 8*

To isotactic polypropylene having an intrinsic viscosity of 1.53 were added 0.25% of 1,1,3-tris(2-methyl-4-hydroxy-5-tert-butylphenyl)butane, 4.0% of a condensation product consisting of epichlorohydrin, stearylamine and piperazine (1.4 mol:0.4 mol:10 mol), 0.4% of a mixture of nickel mono(2-ethylhexyl)phosphonate and nickel di(2-ethylhexyl)phosphate in the proportion of 1:1 and 2% of zinc laurate, and they were melted and mixed at 200° C. for 30 minutes. This composition was then melted again at 260° C. and spun. A multifilament (36 monofilaments) of 75 deniers obtained by thermal drawing 4.5 times showed no change of color and had a strength of 6.7 g./d. and an elongation of 21.3%.

When this sample was subjected to ultraviolet rays in the Weather-o-meter for 300 hours, the original strength was maintained by 92%. However, when a mixture of nickel monooctyl phosphate and nickel dioctyl phosphate in the proportion of 1:1 was not added, the strength was maintained by 83%, and when only the nickel phosphate salts above-mentioned were added, the strength decreased too much to be determined.

*Example 9*

To isotactic polypropylene having an intrinsic viscosity of 1.45 were added 0.20% of 2,2'-methylene-bis(4-methyl-cyclohexylphenol), 0.5% of a mixture of nickel monodecyl phosphate and nickel didecyl phosphate in the proportion of 1:1 and 4% of a condensation product consisting of epichlorohydrin, laurylamine and hexamethylenediamine (1.2 mol:0.2 mol:1.0 mol). After the multifilament obtained in the same manner as in Example 8 was irradiated in the Weather-o-meter for 300 hours, the degree of its original strength maintained was found to be 83%. On the other hand, when no nickel phosphate was added, it was 47%.

*Example 10*

To isotactic polypropylene having an intrinsic viscosity of 1.53 were added 0.2% of 4,4'-butylidene-bis(6-tert-butyl-3-methylphenol) and 3% of a condensation product prepared from 1 mol of epichlorohydrin and 0.8 mol of hexamethylenediamine, and they were melted and mixed at 200° C. for 30 minutes. Further to this mixture was added 0.3% of a mixture of nickel monooctyl phosphate and nickel dioctyl phosphate in the proportion of 1:1. This composition was then melted again at 260° C. and spun. A multifilament (5 monofilaments) of 50 deniers obtained by thermal drawing 4.3 times had a strength of 5.7 g./d. and an elongation of 22.5%. After this sample was irradiated in the Weather-o-meter for 300 hours, the degree of its original strength maintained was found to be 100%.

When a mixture of nickel monolauryl phosphate and nickel dilauryl phosphate in the proportion of 1:1 was added, the degree of original strength maintained was 97%.

On the other hand, when no nickel salt of phosphoric ester was added, the degree of original strength maintained of the sample was 73%.

We claim:
1. A stabilized polypropylene composition comprising polypropylene and:
   (1) 0.01–1 percent by weight of an anti-oxidant having at least one alkyl-substituted phenol radical selected from the group consisting of di-tert-butyl-p-cresol, 2,2'-methylene-bis (4-methyl-6-tert-butylphenol), 2,6-bis(2'-hydroxy-3'-tert - butyl - 5' - methylbenzyl) - 4-methylphenol, 1,1,3-tris(2-methyl-4-hydroxy-5 - tert-butylphenyl)butane, 2,2'-methylene-bis(4-methyl - 6-cyclohexylphenol), di-n-octadecyl ester of (4-hydroxy-3,5-di-tert-butyl)benzylphosphonic acid, 4,4'-butylidene-bis(6-tert-butyl-3-methylphenol), and 6-(4-hydroxy-3,5- di-tert-butylphenylcyclohexylamine)-2,4-bis(n-octylthio)-1,3,5-triazine,
   (2) 0.05–3 weight percent of at least one nickel salt of phosphoric ester represented by the general formula:

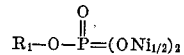

and

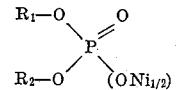

where $R_1$ and $R_2$ represent a radical selected from the group consisting of alkyl, aryl, alkaryl and cycloalkyl radicals, and
   (3) 0–15 percent by weight of a condensation product of epichlorohydrin and at least one amine selected from the group consisting of ethylenediamine, diethylenetriamine, triethylene-tetramine, 1,2-propylenediamine, hexamethylenediamine, piperazine, 1,8-p-menthanediamine, N,N'-diisopropylhexamethylenediamine, 1,3-bis(n-dodecylamine)-2-propanol, and 4,4'-bis-(methylamine)diphenylmethane.
2. The stabilized polypropylene composition according to claim 1 in which the nickel salt of phosphoric ester is nickel mono-2-ethylhexyl phosphate.
3. The stabilized polypropylene composition according to claim 1 in which the nickel salt of phosphoric ester is nickel di-2-ethylhexyl phosphate.
4. The stabilized polypropylene composition according to claim 1 in which the nickel salt of phosphoric ester is nickel monooctyl phosphate.
5. The stabilized polypropylene composition according to claim 1 in which the nickel salt of phosphoric ester is nickel dioctyl phosphate.
6. The stabilized polypropylene composition according to claim 1 in which the anti-oxidant having alkyl-substituted phenol radical is 1,1,3-tris(2-methyl-4-hydroxy-5-tert-butylphenol)butane.

7. The stabilized polypropylene composition according to claim 1 in which the anti-oxidant having alkyl-substituted phenol radical is di-n-octadecyl ester of (4-hydroxy-3,5-di-tert-butyl)benzyl phosphonic acid.

8. The stabilized polypropylene composition according to claim 1 in which the anti-oxidant having alkyl-substituted phenol radical is 4,4'-butylidene-bis(6-tert-butyl-3-methylphenol).

No references cited.

LEON J. BERCOVITZ, *Primary Examiner.*

DONALD E. CZAJA, *Examiner.*

G. W. RAUCHFUSS, *Assistant Examiner.*